(No Model.)  3 Sheets—Sheet 1.

D. D. KUHLMAN.
AUTOMATIC GRAIN WEIGHING APPARATUS.

No. 286,934.  Patented Oct. 16, 1883.

Witnesses.
Robert Everett.
J. A. Rutherford.

Inventor.
David D. Kuhlman,
By James L. Norris.
Atty.

(No Model.) 3 Sheets—Sheet 2.

D. D. KUHLMAN.
AUTOMATIC GRAIN WEIGHING APPARATUS.

No. 286,934. Patented Oct. 16, 1883.

Witnesses.
Robert Everett
J. A. Rutherford

Inventor:
David D. Kuhlman,
By James L. Norris.
Atty.

(No Model.) 3 Sheets—Sheet 3.
D. D. KUHLMAN.
AUTOMATIC GRAIN WEIGHING APPARATUS.
No. 286,934. Patented Oct. 16, 1883.
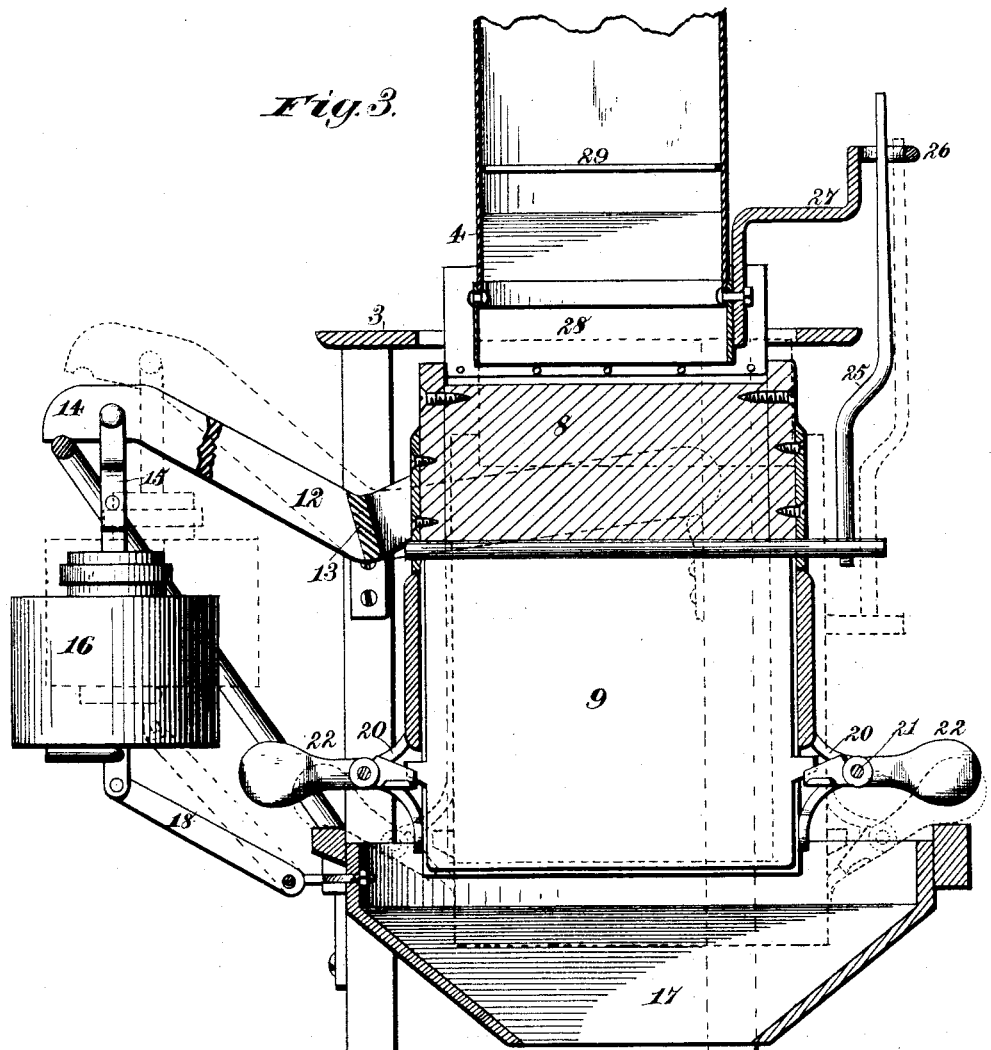
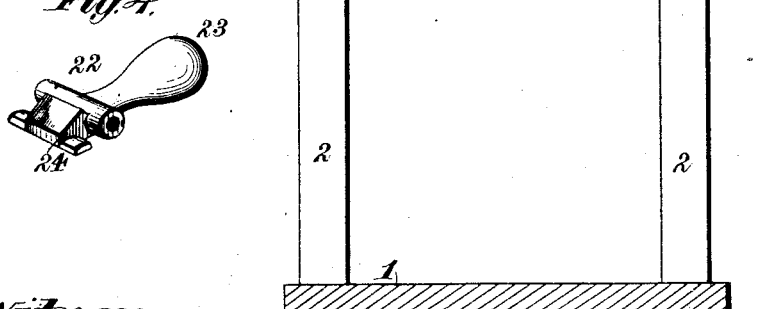
Witnesses. Inventor:
Robert Everitt, David D. Kuhlman,
J. A. Rutherford, By James L. Norris,
Atty.

UNITED STATES PATENT OFFICE.

DAVID D. KUHLMAN, OF NEW YORK, N. Y.

AUTOMATIC GRAIN-WEIGHING APPARATUS.

SPECIFICATION forming part of Letters Patent No. 286,934, dated October 16, 1883.

Application filed September 8, 1883. (No model.)

*To all whom it may concern:*

Be it known that I, DAVID D. KUHLMAN, a citizen of the United States, residing at New York, in the county and State of New York, have invented new and useful Improvements in Automatic Grain-Weighing Apparatus, of which the following is a specification.

This invention relates to improvements in apparatus for automatically weighing grain and other material, and has for its objects to provide novel means for gradually and automatically checking the flow of grain through the chute to the grain-weighing bucket as the amount of grain in the latter becomes sufficient to overbalance the scale-beam; to provide a grain-bucket having an oscillating partition dividing the same into two compartments, with novel means for locking the partition in a closed position to receive and hold grain in one compartment, and to release the partition when the required quantity of grain is supplied thereto, for automatically discharging the grain in said compartment; to provide a grain-bucket having an oscillating partition to divide it into two compartments, with means whereby, when the grain in one compartment is discharged and the partition swung to create the other compartment, a feeder-spout will be swung or moved to direct the flowing grain into the last-mentioned compartment. These objects I accomplish in the manner and by the means illustrated in the accompanying drawings, in which—

Figure 1:
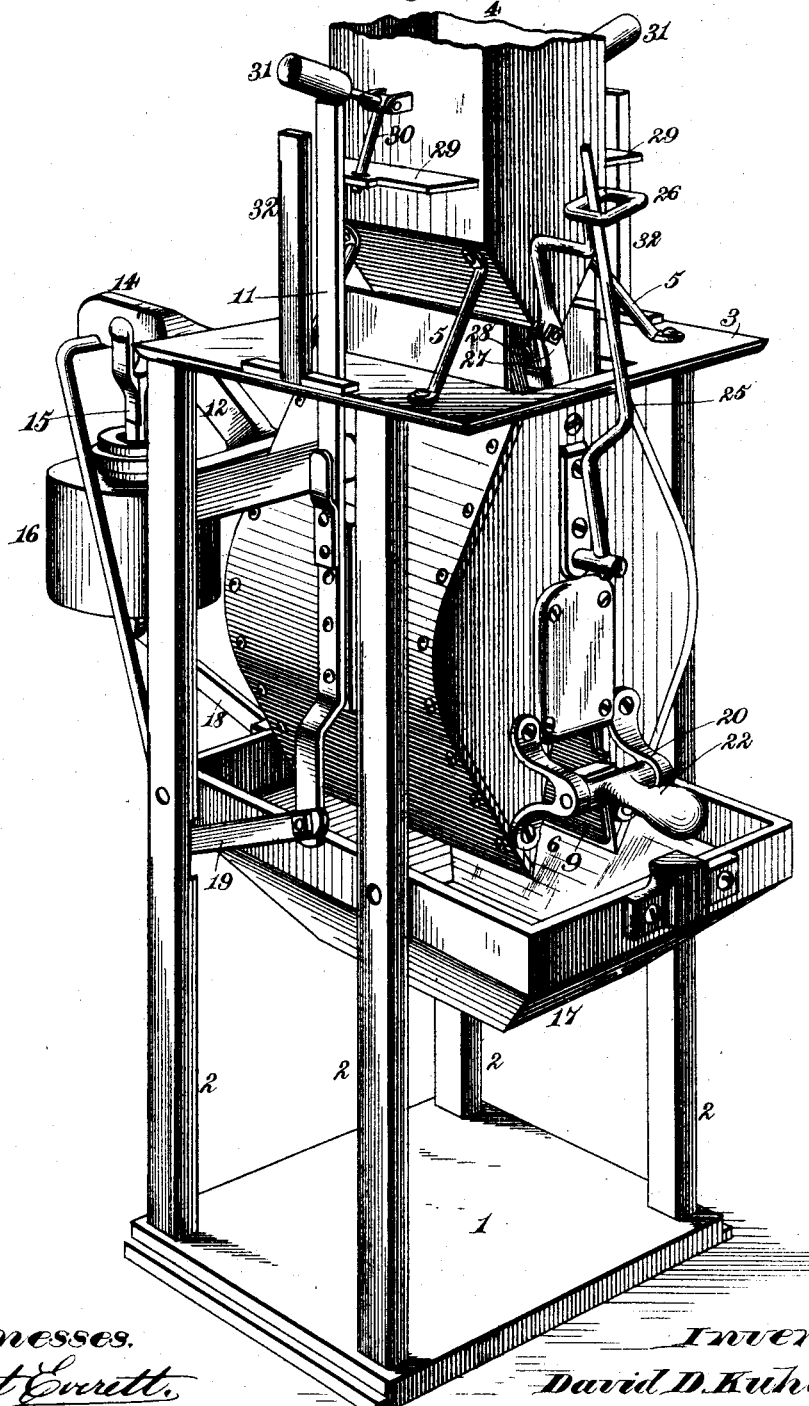
Figure 2:
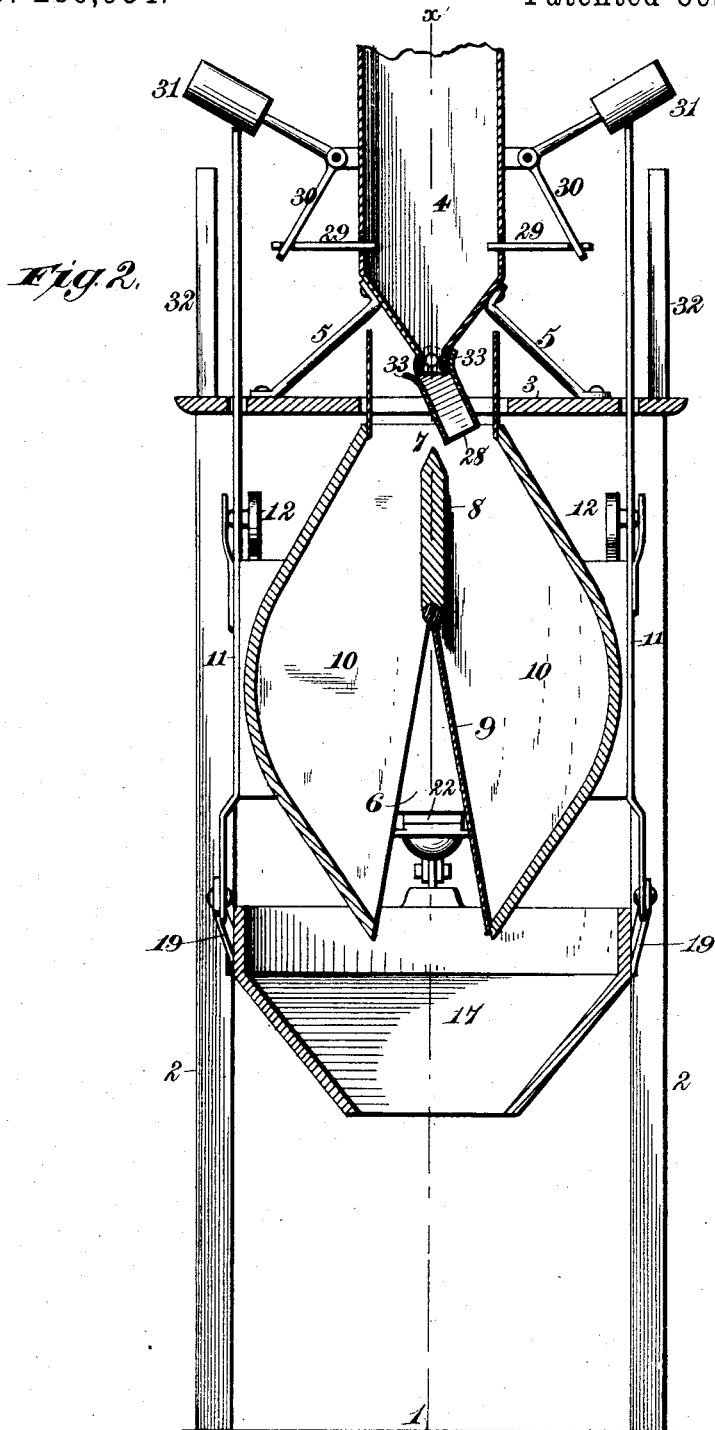

Figure 1 represents a perspective view of an apparatus embodying my invention; Fig. 2, a vertical central sectional view; Fig. 3, a vertical sectional view on the line *x x* of Fig. 2; Fig. 4, a perspective view of the locking-dog.

In the present example the frame of the machine is composed of a base, 1, four corner standards, 2, a top plate, 3, and a hopper having a chute, 4, and supported by rods or braces 5. The grain-weighing bucket has a discharge-mouth, 6, in the form of a V-shaped opening extending upward from the bottom, and is provided with an open receiving-mouth, 7, provided with a rigidly-attached partition, 8, placed centrally in the bucket with relation to the mouth. A rock-shaft passes through the bucket, and is journaled in the ends thereof, said shaft being arranged directly beneath the lower edge of the fixed partition, 8, and to this rock-shaft is secured a pendent oscillating partition, 9, which is adapted to rest against one or the other side of the discharge-mouth 6, and serves to divide the bucket into two compartments, 10 10. The sides of the bucket are provided with vertical rods 11, to which are pivoted the ends of a bifurcated scale-beam, 12, the latter being pivoted at 13 13 to two of the standards, and the projecting end 14 of the beam carries a pendent pivoted link, 15, for receiving and carrying the weights 16.

To the standards 2, directly beneath the discharge-mouth of the bucket, is secured a receiving-hopper, 17, and a rod, 18, connects the lower end of the weight-link 15 with one edge of this hopper, to prevent undue swaying of such link, while pivoted brace-rods 19 connect the vertical rods 11 with two of the standards, to steady the bucket in its rising and falling movements.

To each end of the bucket are secured two brackets, 20, in which are journaled the pivot-pins 21 of dogs 22, which dogs have weights 23 at their outer ends, and oppositely-arranged recesses forming lugs 24 24 at their inner ends, which lugs are adapted to alternately bear against projections at the edges of the oscillating partition, to hold or lock it against one or the other sides of the discharge-mouth of the bucket. The weighted ends of the dogs keep their lugs in engagement with the projections on the partition until the bucket and its contents overbalance the scale-beam, when the descending movement of the bucket causes the weighted ends of the dogs to come in contact with the edge of the hopper 17, thereby lifting the weighted ends and releasing the partition, to permit it to be swung by the weight of the discharging grain.

To one end of the rock-shaft is rigidly attached an upward-projecting lever, 25, which loosely passes through an eye or loop, 26, on a bent arm, 27, that is secured to a feed-spout, 28, hinged to the lower end of the hopper-chute 4, which spout extends the entire length, or approximately so, of the bucket-mouth 7, and the arrangement is such, as clearly shown, that when the oscillating partition is released from the dogs and swings to the opposite side of the discharge-mouth by the discharge of the grain, such partition is automatically locked against such opposite side of the mouth by the dogs, and at the same time the rock-shaft is turned, thereby vibrating the lever 25 and swinging the feed-spout 28, so that it delivers the flowing grain into that compartment of the bucket which is closed at the bottom by the partition, swung and locked as last above stated.

The hopper-chute 4 is provided with two slides, 29, passing horizontally into it from opposite sides, and these slides are connected with one arm of pivoted bell-crank levers 30, the other arm of the levers being provided with weights 31, which normally rest upon the upper ends of the vertical rods 11, in which position the slides are withdrawn, so as to permit the full flow of grain through the hopper-chute to the feed-spout; but as the quantity of grain accumulates in the bucket to such an extent as to cause the bucket to commence its descent, the weighted arms of the bell-crank levers commence to follow the downward movement of the rods 11, gradually pushing the slides inward and checking the flow of grain. At the limit of downward movement of the bucket and its rods 11 the descent of the weighted arms of the bell-crank levers is arrested by stationary posts 32, rising from the top plate, 3. When the bucket discharges, it rises, and the rods 11 raise the weighted arms, thereby drawing the slides outward, and permitting the full flow of grain through the chute. The swinging movements of the bent arm 27, which adjusts the hinged feed-spout first to one side and then the other of the fixed partition 8, are limited by suitable stops, 33, so that the feed-spout will not be swung more than is requisite to bring it into proper position to discharge into the compartment of the bucket which is to be supplied with grain.

It is believed that the operation of the automatic weighing-machine will be readily understood from the foregoing explanations; but I will elaborate by saying that if the oscillating partition is locked in position to close the bottom of the compartment toward the right, Fig. 2, the hinged feed-spout will be in a position to direct the flowing grain into said compartment, and when sufficient grain has been supplied to cause the bucket and its contents to overbalance the scale-beam and its counterpoise the bucket will descend, and in so doing the weighted ends of the dogs will come in contact with the lower hopper and unlock the oscillating partition, when the grain will flow from the bucket, and in so doing swing the partition to the opposite side of the discharge-mouth, to close the bottom of the other compartment. The bucket at once ascends and the dogs lock the partition against said opposite side of the discharge-mouth. The swinging of the partition turns the rock-shaft in its bearings and vibrates its attached lever, thereby swinging the bent arm connected with the hinged feed-spout and adjusting the latter to direct the flowing grain into the compartment having its bottom closed, as set forth. The bucket in descending carries with it the vertical rods, thus causing the weighted bell-crank levers to push the slides of the hopper-chute inward and gradually check the flow of grain, and when the bucket ascends the weighted arms of the bell-crank levers are lifted, thereby drawing the slides outward, and permitting the full flow of the grain through the hopper-chute.

The machine may, if desired, be connected with a registering mechanism to indicate the quantities weighed; but such forms no part of the invention, and is not therefore illustrated.

Various modifications of my invention will suggest themselves to those skilled in the art for accomplishing the objects attained by me, and therefore I do not confine myself to the precise devices shown.

Having thus described my invention, what I claim is—

1. In a grain-weighing machine, the combination of a bucket, a scale-beam, an oscillating partition dividing the bucket into two compartments, and a dog pivoted to the bucket for holding the partition to close the bottom of one or the other compartment, substantially as described.

2. In a grain-weighing machine, the combination of a bucket, a scale-beam, an oscillating partition dividing the bucket into two compartments, a movable feed-spout, and means connecting the spout with the partition for moving the spout by the swinging of the partition, substantially as described.

3. The combination, in a weighing-machine, of a bucket, a scale-beam, an oscillating partition in the bucket, brackets secured to the end of the latter, and a weighted dog journaled in the brackets for locking the partition, substantially as described.

4. The combination, in a weighing-machine, of a scale-beam, a bucket, a rock-shaft therein, a partition on the rock-shaft for dividing the bucket into two compartments, a movable feed-spout, and means connecting the spout with the rock-shaft, substantially as described.

5. The combination, in a weighing-machine, of a scale-beam, a bucket, a rock-shaft therein, a partition attached to said shaft, a lever connected with the shaft, a bent arm operated by the lever, and a hinged feed-spout connected with the bent arm, substantially as described.

6. The combination of the chute, the sliding gates, the pivoted bell-crank levers, a rising and falling grain-bucket having attached vertical rods projecting above its upper end for operating the levers, and means for arresting the descent of the weighted ends of the levers, substantially in the manner and for the purpose described.

7. The combination, in a weighing-machine, of a scale-beam, a grain-bucket suspended therefrom, a stationary partition arranged centrally with relation to the receiving-mouth of the bucket, an oscillating partition directly beneath the stationary partition, and devices carried by the ends of the grain-bucket for automatically locking and unlocking the partition at either side of the discharge-mouth of the bucket, substantially as described.

8. The combination, in a weighing-machine, of a grain-bucket suspended from a scale-beam, and having receiving and discharging mouths, a partition arranged to oscillate within said bucket to move first from one side to the other of the discharging-mouth, and a dog pivoted on the end of the bucket, and having at its inner end the oppositely-arranged lugs for locking the partition against one or the other side of the discharge-mouth of the bucket, substantially as described.

In testimony whereof I have hereunto set my hand in the presence of two subscribing witnesses.

DAVID D. KUHLMAN.

Witnesses:
JAMES L. NORRIS,
ALBERT H. NORRIS.